July 1, 1958 B. C. PHILLIPS 2,841,372
APPARATUS FOR DELIVERING COMBUSTIBLE MIXTURE
TO AN INTERNAL COMBUSTION ENGINE
Filed June 4, 1956 6 Sheets-Sheet 1
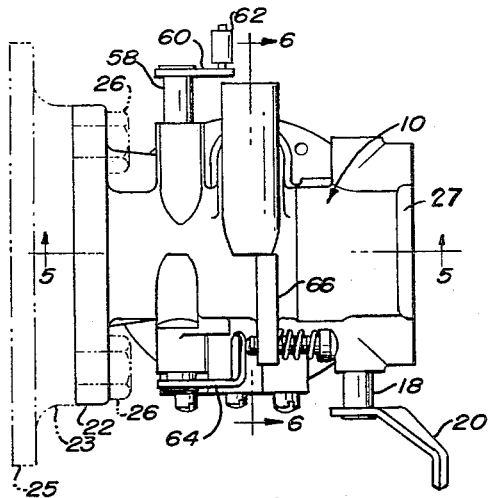
Fig.2.
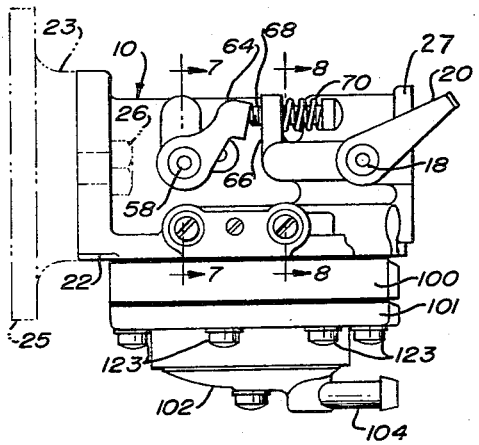
Fig.1.
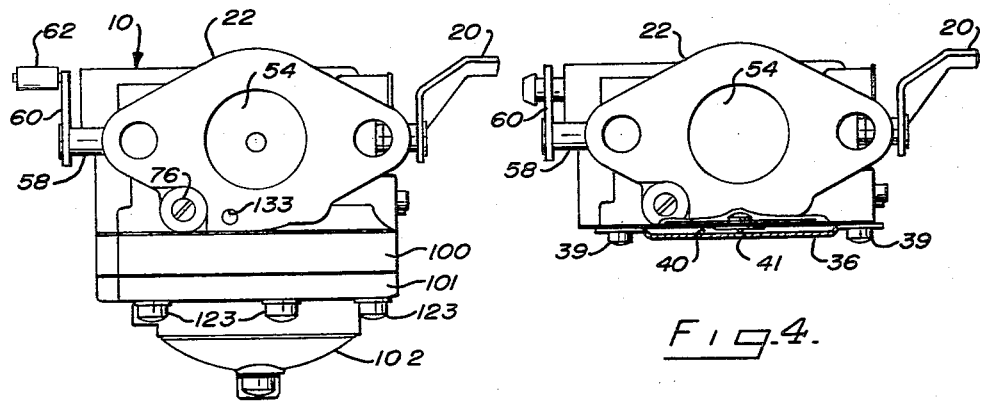
Fig.3.
Fig.4.
INVENTOR
BERNARD C. PHILLIPS
BY
Harry C. Ernsberger
ATTORNEY July 1, 1958  B. C. PHILLIPS  2,841,372
APPARATUS FOR DELIVERING COMBUSTIBLE MIXTURE
TO AN INTERNAL COMBUSTION ENGINE Filed June 4, 1956  6 Sheets—Sheet 2

INVENTOR
BERNARD C. PHILLIPS
BY
Harry O. Ernsberger
ATTORNEY

July 1, 1958 B. C. PHILLIPS 2,841,372
APPARATUS FOR DELIVERING COMBUSTIBLE MIXTURE
TO AN INTERNAL COMBUSTION ENGINE
Filed June 4, 1956 6 Sheets-Sheet 3
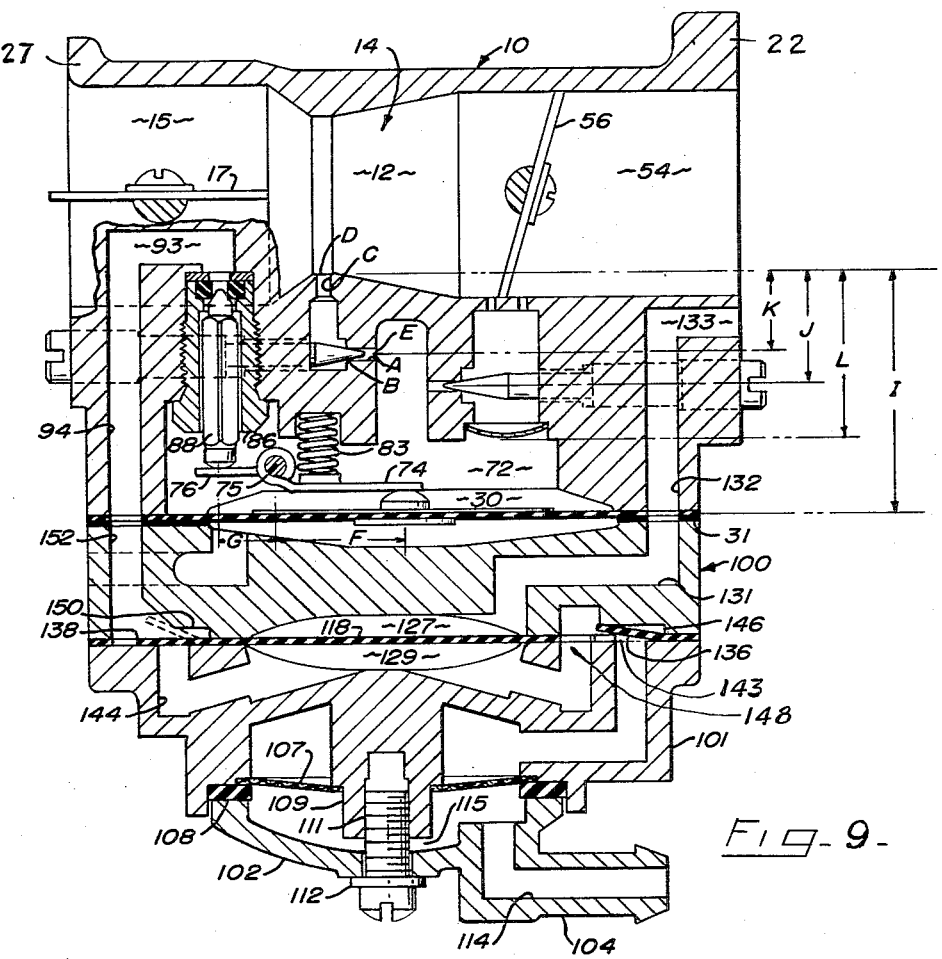
Fig-9-
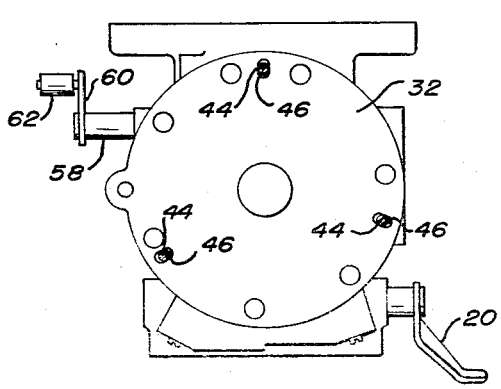
Fig-23.
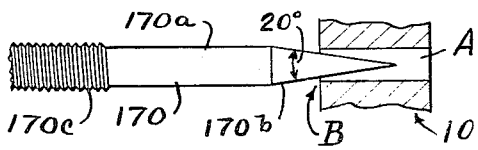
Fig-25-
INVENTOR
BERNARD C. PHILLIPS
BY
Harry C. Eneberger
ATTORNEY

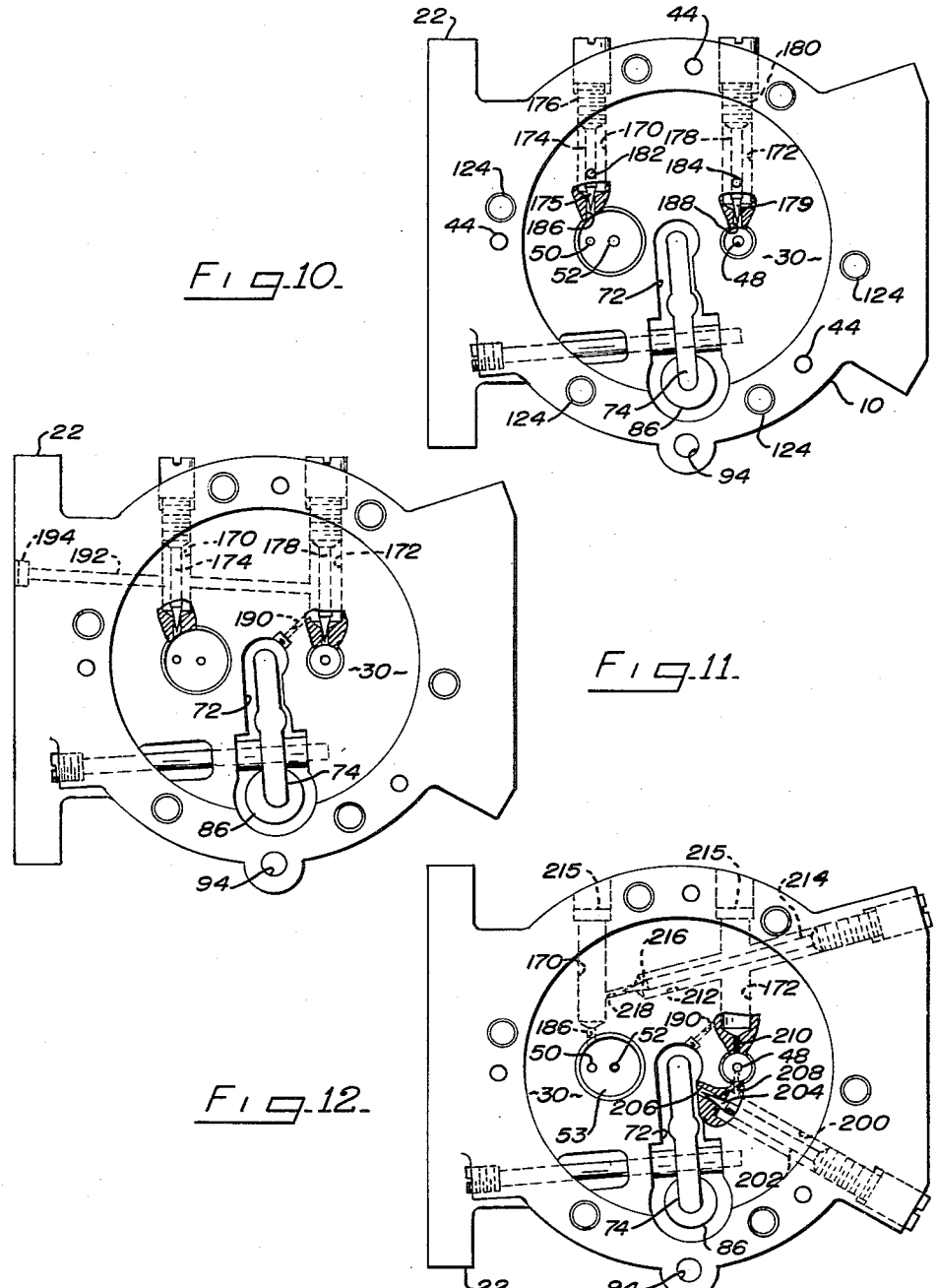

July 1, 1958 B. C. PHILLIPS 2,841,372
APPARATUS FOR DELIVERING COMBUSTIBLE MIXTURE
TO AN INTERNAL COMBUSTION ENGINE
Filed June 4, 1956 6 Sheets-Sheet 5

INVENTOR
BERNARD C. PHILLIPS
BY
Harry A. Ernsberger
ATTORNEY

INVENTOR:
BERNARD C. PHILLIPS.

United States Patent Office 2,841,372
Patented July 1, 1958

2,841,372

APPARATUS FOR DELIVERING COMBUSTIBLE MIXTURE TO AN INTERNAL COMBUSTION ENGINE

Bernard C. Phillips, Toledo, Ohio, assignor to The Tillotson Manufacturing Company, Toledo, Ohio, a corporation of Ohio Application June 4, 1956, Serial No. 589,170

17 Claims. (Cl. 261—41)

This invention relates to fuel feeding and charge forming apparatus for use with internal combustion engines and more especially to apparatus for delivering a fuel and air mixture to an internal combustion engine irrespective of the relative position of the engine and charge forming apparatus.

Internal combustion engines, and particularly those of the two cycle type, are being utilized extensively for powering lawn mowers, chain saws, small boats and for other similar uses where the engine and charge forming device are sometimes tilted to extreme angular positions. Engines for driving chain saws must be adaptable for operation in all angular positions including inverted position.

The conventional type of charge forming device embodying a float-actuated fuel control valve is wholly unsuitable for use with engines which are to be operated in extreme angular positions. Charge forming devices embodying diaphragm controlled fuel supply means have been developed and have been used but such devices heretofore employed have been extremely critical in operation and adjustment.

The present invention embraces an apparatus for delivering or feeding a fuel and air mixture to an internal combustion engine irrespective of the relative angular position of the engine.

Another object of the invention relates to a system of supplying liquid fuel to a mixing passage of a charge forming apparatus incorporating multiple fuel delivery channels whereby the surface tension and capillary characteristic of liquid fuel in the channels is rendered effective to restrict or prevent entrance of air into a main fuel delivery system from the mixing passage when fuel is being delivered into the mixing passage through a secondary system for engine idling and low speed purposes.

Another object of the invention is the provision of a charge forming device of a character embodying a diaphragm actuated fuel flow control means wherein the diaphragm is instantly responsive to minute variations in pressure in the mixing passage whereby the fuel requirements of the engine are satisfied at all engine speeds.

Another object is the provision of a diaphragm type of charge forming device wherein fuel is delivered into the mixing passage solely by aspiration established through engine operation and with a minimum of differential pressure.

Another object of the invention is the provision of a carburetor or charge forming device of the diaphragm type having fuel delivery channels opening into a mixing passage for high speed and engine idling and low speed purposes wherein the high speed fuel delivery arrangement embodies a restricted zone or zones in which the fuel forms an effective barrier or seal preventing air bleeding through the high speed fuel delivery system without the use of check valves or other mechanical means.

Another object of the invention is the provision of a diaphragm type carburetor or charge forming device wherein the fuel passages are so arranged as to utilize the capillary action and surface tension and meniscus effect of the liquid fuel as a nozzle check or valve means to prevent back bleeding of air from the mixing passage into the fuel chamber under idling conditions as well as during high speed operations of the engine.

Another object of the invention is the provision of a diaphragm type of carburetor embodying a guide arrangement and mounting construction for the diaphragm wherein a relation is established between the guide means and openings in a peripheral zone of the diaphragm receiving the guide means setting up a flexibility in the central zone of the diaphragm whereby a regulated or controlled amount of "dish" or concavity of the diaphragm is obtained obviating the necessity of forming circular convolutions in the diaphragm.

Another object of the invention is the provision of a diaphragm type charge forming device wherein fuel is delivered into the mixing passage solely by engine aspiration at a minimum of subatmospheric or reduced pressure whereby a fluid seal established by the liquid fuel in the passages or channels of the main fuel delivery system in the charge forming device is not interrupted or fractured when the engine is operating under idling or low speed conditions when fuel is supplied to the mixing passage through a secondary fuel delivery system.

Another object of the invention is the provision of a carburetor of the diaphragm type wherein the distance or dimension between the diaphragm and the mixing passage is maintained at a minimum providing a minimum lift whereby fuel is delivered into the mixing passage by aspiration under comparatively small differential or subatmospheric pressures.

Another object of the invention resides in a combined fuel delivery means and mixture forming apparatus for an internal combustion engine wherein a flexible wall or diaphragm of a pumping or pulsating chamber is connected through a suitable duct with the crankcase of the engine with which the charge forming apparatus is used whereby varying pressures in the engine crankcase are utilized for vibrating or moving the flexible diaphragm, providing a motivating means for flowing liquid fuel from a supply to the charge forming apparatus.

A further object of the invention is the provision of a diaphragm type carburetor or charge forming device adaptable for use with an independent fuel supply means or which may form a unit or component of a combined charge forming apparatus and fuel pumping or supply means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention which may be preferred, in which:

Figure 1 is a side elevational view illustrating one form of combined charge forming device and fuel feeding means of the invention;

Figure 2 is a top plan view of the arrangement shown in Figure 1;

Figure 3 is an end view of the arrangement shown in Figure 1;

Figure 4 is a view similar to Figure 3 showing the charge forming device or carburetor per se;

Figure 9 is an enlarged schematic sectional view through the charge forming device and fuel feeding means illustrating the interrelation of the various components of the construction;

Figure 10 is a horizontal bottom plan view of the charge forming device with the diaphragm removed illustrating one arrangement of fuel channels and metering means for supplying liquid fuel to a main orifice and idling and low speed fuel orifices for delivery into the mixing passage;

Figure 11 is a view similar to Figure 10 showing a modified arrangement of fuel channels and metering means for supplying fuel to a main orifice and the idling and low speed orifices;

Figure 12 is a view similar to Figure 10 illustrating a further arrangement of fuel passages and metering means for supplying fuel to a main, idling and low speed orifices;

Figure 23 is a view taken substantially on the line 23—23 of Figure 13 and illustrating the method of mounting the diaphragm forming a wall of the carburetor fuel chamber to secure a concave or dished configuration of the diaphragm;

Figure 25 is a diagrammatic sectional view showing a fuel adjusting means.

Figure 5:
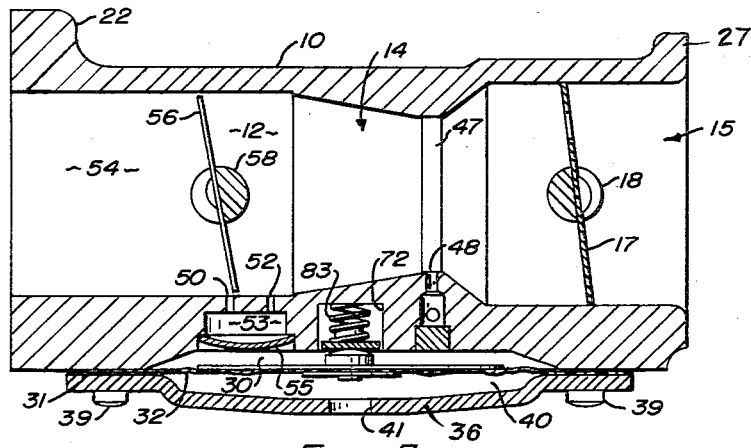
Figure 5 is a longitudinal sectional view taken substantially on the line 5—5 of Figure 2.

While the charge forming and fuel feeding apparatus of the present invention are illustrated as particularly constructed and adapted for carrying out the method of delivering fuel to an internal combustion engine of the so-called two cycle type, it is to be understood that the arrangement of the invention may be utilized with other types of internal combustion engine whereever a diaphragm type of carburetor or charge forming apparatus of the character disclosed may be used.

It should be further understood that the invention embraces a particular interrelation and coordination of components of the charge forming device whereby a so-called free position operation is obtained, that is, wherein the charge forming device may be satisfactorily and effectively used in various angular as well as inverted positions and supply fuel to a mixing passage to maintain the engine in operation irrespective of the position of the engine.

Referring to the drawings in detail, and initially to Figures 1, 2, 3, and 13, there is illustrated a combined charge forming device or carburetor and a fuel feeding means or fuel pump fashioned as a unitary construction. The charge forming device or carburetor component is of the diaphragm type and is constructed with a minimum of fuel lift distance whereby fuel may be readily delivered into a mixing passage to be mixed with air and thence into the crankcase of a two cycle internal combustion engine by reason of the aspirating effect of varying pressures in the engine crankcase.

Figures 4 through 8 inclusive illustrate a form of charge forming device of the invention without the fuel feeding pump, and it is to be understood that Figures 1 through 8 and 10 through 13 are illustrative of the same carburetor component, Figure 9 illustrating in schematic form the combined carburetor construction and the fuel feed means or pump for delivering fuel to the carburetor.

The charge forming device or carburetor component of the construction is inclusive of a body 10 formed with a mixing passage 12, the passage including a Venturi 14 into which fuel is delivered for admixing with air admitted through an air inlet 15. A disk type valve 17 mounted upon an operating shaft 18 is disposed in the inlet passage 15 and is adapted for controlling the amount of air admitted to the mixing passage 12 formed in the body 10. Mounted upon an end of the shaft 18 projecting exteriorly of the body 10 is an arm 20 for manipulating or regulating the position of the choke or air valve 17.

The carburetor body 10 is provided with a flange portion 22 which is adapted to be secured to a boss portion 23 formed on a wall of the crankcase 25 of an engine of the two cycle type, the crankcase wall being shown in broken lines in Figures 1 and 2. The flange 22 is secured to the boss on the engine crankcase by means of bolts 26. The air inlet end of the body 10 is formed with a flange 27 to be secured to an air filter or cleaner (not shown).

Figure 6:
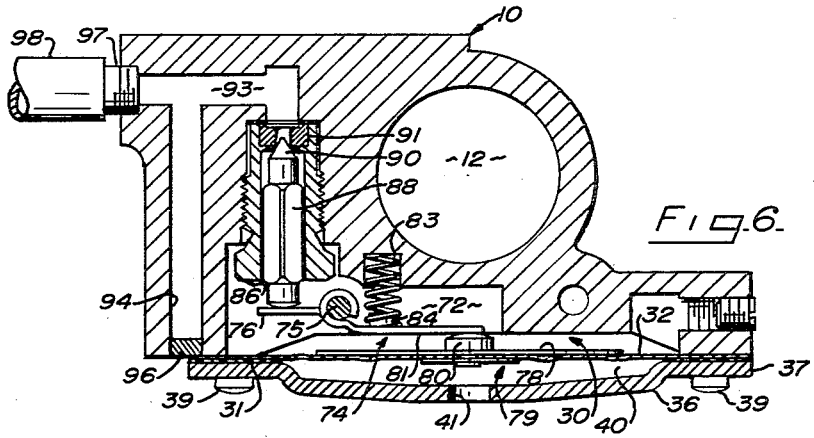
Figure 6 is a transverse sectional view through the carburetor, the view being taken substantially on the line 6—6 of Figure 2.
Figure 7:
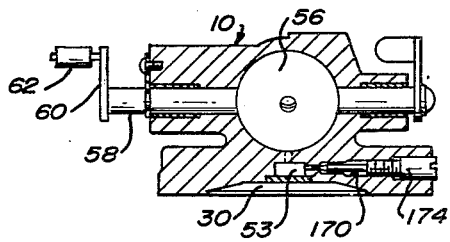
Figure 7 is a detail sectional view through the carburetor, the view being taken substantially on the line 7—7 of Figure 1.
Figure 8:
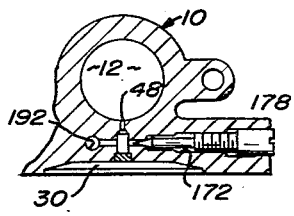
Figure 8 is a detail sectional view through the carburetor, the view being taken substantially on the line 8—8 of Figure 1.

The body 10 of the charge forming device is formed with a fuel chamber or passage 30, and a flexible member or diaphragm 32 forms one wall of the chamber or passage 30 as shown in Figures 5 and 6. An annular gasket 31 is disposed adjacent one face of the flexible diaphragm 32 as shown in Figures 5 and 6. In the arrangement of combined carburetor and fuel feeding or pumping means of the character illustrated in Figures 1, 3 and 13, the gasket 31 is engaged by a member or component 100 forming part of the fuel pumping means.

In the arrangement of the charge forming device shown in Figures 4, 5, and 6 wherein the fuel is delivered to the charge forming device by gravity or by pumping means disposed remotely of the charge forming device, the gasket 31 is engaged by a cover plate 36. In this form, the cover plate 36 which may be formed of sheet metal or molded resinous plastic and has a peripheral planar portion 37 provided with openings adapted to receive screws 39 for securing the cover plate 36 to the carburetor body 10.

The cover plate 36 is formed with a depressed central portion providing a space 40 to accommodate reciprocatory movements or vibrations of the diaphragm 32, the space 40 being vented to the atmosphere by means of an opening 41. The diaphragm 32 is made of very thin highly flexible cloth as, for example, nylon fabric impregnated with a suitable coating to render the diaphragm impervious.

Heretofore it has been a practice to form diaphragms with one or more concentric annular convolutions in order to provide for flexing or reciprocatory movements of the diaphragm. A feature of this invention resides in the provision of a planar diaphragm and a means of mounting the same whereby the required amount of "dish" or concavity is obtained without the necessity of preshaping the diaphragm with annular convolutions.

As shown in Figure 23, the body 10 of the carburetor is provided with a plurality of projections or pins 44. The diaphragm 32 is formed with an equal number of openings 46 having the same circumferential spacing as the pins 44 but the openings 46 are normally spaced at greater radial distances from the center of the diaphragm than the pins or projections 44. The diaphragm 32 is fitted into place with the openings 46 received over the pins 44, and this operation forces or flexes the central zone of the diaphragm inwardly in a loose or wavy formation which establishes the required amount of "dish" or concavity for the diaphragm to facilitate reciprocatory motions or vibrations without necessitating stretching or pulling of the diaphragm. This arrangement not only facilitates the use of a comparatively thin, highly flexible diaphragm but also avoids or eliminates the necessity for the preshaping of annular convolutions in the diaphragm. The extremely flexible and very thin diaphragm is highly sensitive to minute variations or changes in pressure in the fuel chamber or passage 30 thus providing an efficient and uniform delivery of liquid fuel into the mixing passage.

Fuel from the chamber or passage 30 is delivered into the restricted zone or choke band 47 of the Venturi 14 through a main or primary orifice, nozzle or tubular passage 48 supplied with fuel through passages and metered by suitable means as hereinafter described. Also opening into the wall of the mixing passage is a secondary fuel delivery system including an idling orifice 50 and a second orifice 52, the latter being used for low speed engine operations. The manner of supplying fuel to these orifices will be hereinafter described.

Disposed in the outlet zone 54 of the mixing passage 12 is a throttle valve 56 of the disk type which is mounted upon a transversely extending shaft 58, the shaft being rotatable to vary the position of the throttle valve 56 for controlling the admission of fuel and air mixture into the engine crankcase to regulate the speed of the engine. An arm 60 is mounted on one end of the shaft 58 provided with a roller 62 adapted to be engaged by a suitable throttle actuating means (not shown).

Secured to the opposite end of the shaft 58 is an L-shaped arm 64. The carburetor body 10 is provided with a projecting portion 66 having a threaded opening to receive a threaded member or screw 68. The extremity of the screw 68 forms a stop means engageable with a portion of the L-shaped arm 64 to limit the closing movement of the throttle valve 56. A coil spring 70 surrounds the threaded member 68 and bears against the projection 66 and provides sufficient friction to hold the threaded member 68 in adjusted position.

Means is provided in the charge forming apparatus for controlling the flow of fuel from a supply into the fuel chamber or passage 30. The diaphragm control arrangement for the fuel inlet valve is shown in detail in Figures 6 and 9. The fuel inlet passage in the carburetor body as shown in Figure 6 is arranged to be connected to a fuel pump situated remote from the carburetor or is adapted to receive fuel by gravity from a supply tank.

When this system of delivering fuel to the charge forming apparatus is utilized, the diaphragm 32 is secured to the carburetor body by means of the plate 36 as shown in Figure 6. When a fuel feeding means is integrated or combined with the charge forming apparatus as particularly shown in Figures 1, 3, 9 and 13, a modified form of fuel inlet channel arrangement into the charge forming device is employed as hereinafter explained.

The carburetor body 10 is formed with an elongated recess 72 forming a part of the fuel passage or diaphragm chamber 30 and is adapted to accommodate a lever or lever member 74 pivotally supported upon a pin 75. The pin 75 has a head portion 76 projecting exteriorly of the carburetor body as shown in Figures 3 and 4 to facilitate assembly and removal of the pin or shaft 75. The diaphragm 32 is provided at its opposite sides with disks 78 and 79 which are held together by means of a headed member 80. The head of member 80 is in continuous operational engagement with the end zone of arm 81 of the lever member 74. A coil spring 83 is contained in a bore adjacent the recess 72, the lower end engaging the lever arm 81 and being held in place by means of a struck-up projection 84 formed on the lever member.

Threaded into a bore formed within the carburetor body 10 is a fitting 86. Slidably disposed in a bore formed in the fitting 86 is a valve member 88 of polygonally shaped cross-section. The polygonally shaped cross-section of valve member 88 facilitates flow of liquid fuel along the facets of the valve body into the fuel passage or chamber 30. The valve member 88 is formed with a cone-shaped extremity or valve portion 90 which cooperates with a valve seat 91 disposed in the upper end zone of the fitting 86.

The valve seat 91 is preferably formed of a resilient material as for example a synthetic material such as neoprene or other material which is not subject to deterioration upon contact with hydrocarbon fuels. The opening in the valve seat 91 should be of comparatively small diameter so that the fuel pressure acting against the cone shaped valve portion 90 is reduced to a minimum.

As shown in Figure 6, the opening in the valve seat 91 is in communication with interconnecting ducts 93 and 94. When the charge forming apparatus or carburetor is used with a gravity fuel supply or a feeding means positioned remotely with respect to the carburetor, the vertically arranged duct 94 is closed by means of a plug 96. The entrance of the fuel duct 93 may be threaded to accommodate the threaded extremity of a fuel supply tube 98 as shown in Figure 6.

It should be pointed out that the fuel chamber or passage 30 is not vented to the atmosphere and fuel from the chamber or passage is delivered into the mixing passage of the carburetor by engine aspiration either through the main nozzle 48 or the idling and low speed orifices 50 and 52. By reason of the fact that fuel is delivered into the mixing passage solely by aspiration effect of the reduced pressure therein acting upon the fuel chamber 30, there is no predetermined or defined fuel level in the chamber 30.

As fuel is delivered into the mixing passage under the influence of reduced pressure transmitted through the fuel orifices to the fuel chamber 30, the flow of fuel into the mixing passage depletes the supply in the fuel passage or chamber 30, further decreasing the pressure in the chamber 30. This reduction in pressure in chamber 30 causes the diaphragm 32 to be flexed upwardly as viewed in Figure 6 by atmospheric pressure on the opposite side of the diaphragm, causing the lever member 74 to pivot in a counterclockwise direction about the supporting pin or shaft 75.

The short arm 76 of the lever member moves downwardly whereby fuel pressure of the supply existent in the duct 93 which is greater than the pressure in chamber 30, moves the valve 90 away from the seat 91 facilitating the flow of fuel from the supply past the valve body 88 and into the fuel chamber 30. The flow of fuel into the chamber 30 slightly increases the pressure in the chamber 30 and, under the influence of the expansive coil spring 83, the lever member 74 is swung about the pivot shaft 75 in a clockwise direction as viewed in Figure 6 as the diaphragm 32 moves or is flexed downwardly under the influence of the increase in pressure in the chamber 30.

The movement of lever member 74 elevates the valve body 88 and the valve portion 90 again closing the opening in the valve seat 91 to interrupt flow of liquid fuel into the chamber 30 until the continued delivery of fuel into the mixing passage further reduces the pressure in the fuel passage or chamber 30. In actual practice during engine operation it is found that a balance is substantially maintained whereby the rate of flow of fuel past the valve 90 is substantially equal to the rate of delivery of the fuel from the chamber 30 into the mixing passage 12, the control valve being in slightly open position during most of the period of engine operation.

The combined fuel feeding means and charge forming apparatus is illustrated in Figures 1, 3, 9 and 13 through 22 inclusive. When the carburetor is integrated or combined with a fuel feeding means, the threaded entrance zone of the fuel duct 93 shown in Figure 6 is closed by means of a plug or other form of closure.

The fuel pumping or fuel feeding arrangement includes a pump body construction formed by components or members 100, 101 and 102. The closure member 102, which may be formed of molded nylon or other material is provided with a tubular projection 104 adapted to be connected to a fuel supply tank (not shown) by means of a flexible tube 106 shown in Figure 13. The member 101 is formed with a circular recess arranged to receive the peripheral edge zone of a fuel filter or strainer 107.

A gasket 108 of annular shape is also fitted into the recess and is engaged by a circular peripheral portion of the closure member 102 for retaining the strainer 107 in position. The member 101 is formed with a depending boss 109 formed with a threaded bore adapted to receive a screw 111 for holding the closure member 102 in position. A sealing gasket 112 is interposed between the head of the screw and the closure 102.

The projection 104 is provided with an inlet passage 114 which conveys fuel from the supply into a sump or chamber 115 formed by the closure member 102. Thus any foreign matter strained from the fuel by the screen or filter 107 is collected upon the inner surface of the closure member 102. For purposes of illustration Figure 9 exemplifies a section through the fuel pumping construction and is semischematic in character to better show the valves and fuel passages in the pumping arrangement.

In the arrangement of the invention embodying the fuel pumping means as an integrated component of the charge forming apparatus, the member 100 is in direct engagement with the sealing gasket 31 adjacent the diaphragm 32 forming a wall of the fuel chamber 30 in the carburetor. Disposed between the members or components 100 and 101 is a flexible diaphragm or fuel pumping element 118 which is formed of flexible impervious material such as synthetic rubber or cloth such as nylon impregnated or coated with a material which is resistant to deterioration by hydrocarbon fuels.

The pump body member 100 is provided with a plurality of openings 121 and the body member 101 provided with a plurality of openings 122 which, when the member 100 and 101 are in assembled relation, are in aligned condition and adapted to receive securing screws 123 which extend into threaded openings 124 formed in the carburetor body 10 as shown in Figure 10. The screws 123 also pass through openings 125 formed in a peripheral zone of the pumping diaphragm 118.

Figure 13:
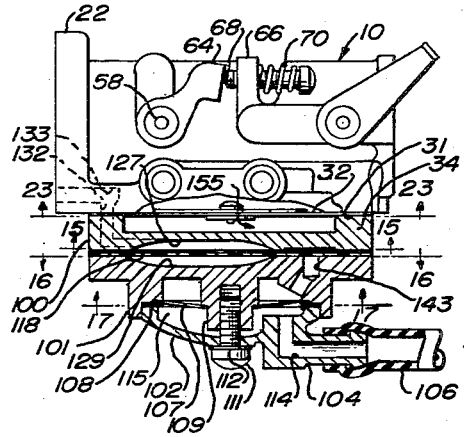
Figure 13 is an elevational view of the combined carburetor and fuel feeding means, the latter being shown in section.
Figure 14:
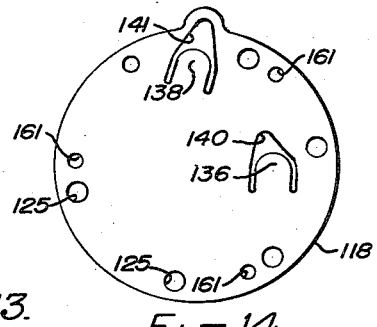
Figure 14 is a plan view of the pumping diaphragm or element of the fuel feeding means.
Figure 15:
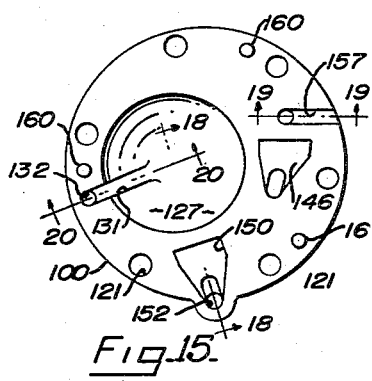
Figure 15 is a view taken substantially on the line 15—15 of Figure 13.

As shown in Figures 13 and 15, the central zone of the pump body member 100 is formed with a spherically shaped recess or depression 127 forming a pumping chamber, and the pump body member 101 is formed with a spherically shaped recess or depression forming or providing a fuel chamber 129. The diaphragm 118 forms an intermediate wall separating the chambers 127 and 129 as shown in Figures 9 and 13.

The pumping chamber 127 is arranged to be connected with a source of periodically or intermittently varying or differential pressure whereby the diaphragm 118 is vibrated or flexed to exert a pumping action in the fuel chamber 129. In the embodiment illustrated herein as shown in Figures 9, 13 and 15 a passage 131 formed in the body member 100 is in communication with a vertically disposed passage or channel 132 which is in communication with a passage 133 formed in the flange 22 of the carburetor body 10.

The passage 133 is shown in Figure 3 and is arranged to be in communication with the interior of the crankcase 25 of the engine with which the carburetor and fuel feeding means is used. The pressures in the engine crankcase, especially in engines of the two cycle type, alternately increase and decrease during each revolution of the engine crankshaft. The varying pressures existent in the engine crankcase during engine operation are communicated to the chamber 127 through the passages 133, 132 and 131 to effect a pulsating or pumping action of the diaphragm 118 which sets up a pumping action in the fuel chamber 129 by varying the volume of the latter.

In the present arrangement, the valve means for controlling the flow of liquid fuel into and away from the fuel chamber 129 in the pumping means are integral components of the diaphragm 118. As particularly shown in Figure 14, the inlet valve 136 and the outlet valve 138 are formed by punching or removing material of the diaphragm providing spaces 140 and 141, the valve portions 136 and 138 being shaped as tongues adapted to be flexed at the hinge or zone of juncture of the valve portions with the remainder of the diaphragm 118.

Figure 16:
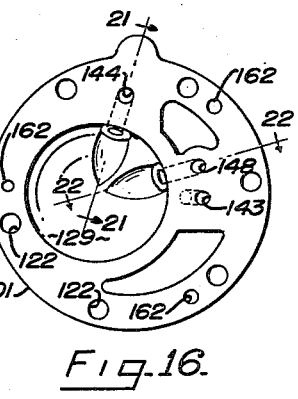
Figure 16 is a view taken substantially on the line 16—16 of Figure 13.
Figure 17:
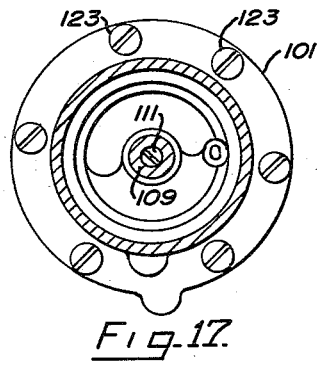
Figure 17 is a sectional view taken substantially on the line 17—17 of Figure 13.
Figure 18:
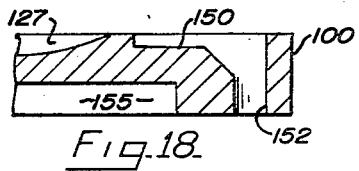
Figure 18 is a fragmentary detail sectional view taken substantially on the line 18—18 of Figure 15.
Figure 19:
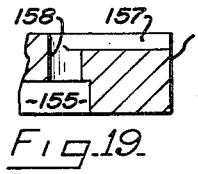
Figure 19 is a fragmentary detail sectional view taken substantially on the line 19—19 of Figure 15.
Figure 20:
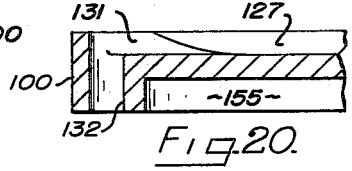
Figure 20 is a fragmentary sectional view taken substantially on the line 20—20 of Figure 15.
Figure 21:
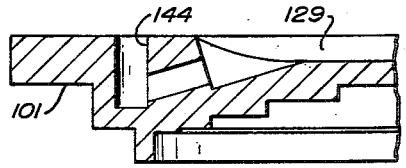
Figure 21 is a fragmentary sectional view taken substantially on the line 21—21 of Figure 16.
Figure 22:
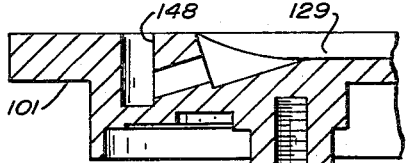
Figure 22 is a fragmentary sectional view taken substantially on the line 22—22 of Figure 16.

The valve portion 136 controls the port 143 shown in Figures 13 and 16 which is in communication with the chamber above the strainer 107 formed in the pump body member 101 as shown in Figure 9. The outlet valve member 138 is adapted to cooperate with a port or passage 144 adapted to convey liquid fuel out of the fuel chamber 129.

The body member 100 is formed with a recess 146 which accommodates movement of the valve member 136 and forms a channel to facilitate flow of fuel from the port 143 through the passage 148 into the fuel chamber 129. The pump body member 100 is formed with a second recess 150 to accommodate movement of the valve member 138 controlling flow of liquid fuel through the port 144 into a vertically disposed outlet or passage 152 formed in the body member 100. The fuel outlet passage 152 is in registration with the fuel passage 94, shown in Figure 9, formed in the body portion 10 of the carburetor. In the arrangement embodying the fuel feeding means hereinabove described, the plug or cap 96 shown in the fuel passage 94 in Figure 6 is eliminated so that fuel may flow direct from the fuel pumping chamber 129 through the port 144, the recess 150 and passages 152 and 94 to the zone above the fuel flow control valve 90 shown in Figure 6.

The pump body member 100 is formed at its upper portion with a shallow circular chamber 155 adapted to accommodate flexure or reciprocatory movements of the carburetor diaphragm 32. The circular chamber 155 is vented to the atmosphere by means of a passage or vent 157 which communicates with the circular chamber 155 through a vertically disposed connecting duct 158 shown in Figure 19.

The pump body component or member 100 is provided with circumferentially spaced pins 160 which project through openings 161 formed in the diaphragm 118, the projections being received in sockets or bores 162 formed in the pump body component 101. The pin and socket arrangement provides means for properly retaining the diaphragm 118 and the pump body members 100 and 101 in proper relationship.

The operation of the fuel feed or pumping means is as follows: Assuming that the fuel flow control valve 90 shown in Figure 6 in the carburetor body 10 is moved from its seat to facilitate flow of liquid fuel into the carburetor chamber 30, the varying pressures in the crank case of the engine with which the carburetor is used are transmitted through the ducts or passages 133, 132 and 131 to vary the pressure in the pumping chamber 127. The varying pressures in chamber 127 cause reciprocating or pumping movements of the diaphragm 118. When the diaphragm 118 is flexed downwardly as viewed in Figure 13 by reason of an increase in pressure in the pumping chamber 127, the volume of the fuel chamber 129 is reduced, this action forcing liquid fuel in the chamber 129 past the valve 138 through the recess 150 shown in Figure 15 through the outlet 152 and passages 94 and 93 in the carburetor body shown in Figure 6 to a zone adjacent the valve 91. When the valve is open the fuel flows into the carburetor fuel passage or chamber 30.

Upon flexure of the pumping diaphragm 118 upwardly as viewed in Figure 13 when the pressure in the engine crank case is reduced, the volume of the fuel chamber 129 is increased, causing fuel to flow from the fuel strainer chamber 115 through port 143, recess 146, through the port 148 and into the fuel chamber 129 of the pumping means. Upon succeeding flexure of diaphragm 118 downwardly the fuel in chamber 129 is again forced past the valve 138 and into the carburetor through the passages hereinabove mentioned.

This pumping action of diaphragm 118 continues during the period that the valve 90 in the carburetor is in open position to permit flow of fuel into the diaphragm chamber 30 of the carburetor. When the fuel requirements of chamber 30 have been satisfied and valve 90 is in closed position, fuel pressure is maintained in the ducts or passages leading from the fuel chamber 129 to the zone adjacent the fuel flow control valve 90, but further flexure of the diaphragm 118 ceases because fuel pressure in the chamber is sufficient to close the valve 90 and further pumping of fuel from chamber 129 ceases.

Figures 10, 11 and 12 are bottom plan views of the carburetor body with the diaphragm 32 removed and certain portions shown in section. These figures are illustrative of three different forms of fuel conveying channel and fuel metering or regulating means for delivering fuel from the diaphragm chamber 30 to the main nozzle for normal engine operation and to the idling and low speed orifices for idling and low speed engine operation.

In the form shown in Figure 10 the carburetor body is provided with spaced transversely arranged passages 170 and 172. Disposed in the passage 170 is a valve member or valve body 174 having a needle or cone shaped valve portion 175, the valve body 174 being formed with a threaded portion 176 adapted for engagement with a threaded zone of the passage 170. Disposed in the passage 172 is a valve member or body 178 having a cone shaped or needle valve portion 179, the valve body being provided with a threaded portion 180 which engages a threaded zone of the passage 178.

The passage 170 receives fuel from chamber 30 through a passage 182, and passage 172 receives from chamber 30 through a passage 184. The needle valve 175 extends into a restricted passage 186 which conveys fuel from passage 30 to the idling orifice 50 and the low speed orifice 52. The needle valve portion 179 valve body 178 extends into and cooperates with a restricted passage 188 for regulating or metering the flow of liquid fuel to the main nozzle or orifice 48 and into the mixing passage 12.

The arrangement of fuel passage and metering means shown in Figure 10 is particularly adaptable for use with a gravity fuel feed arrangement for delivering fuel from a supply tank through the tube 98 to the carburetor arrangement shown in Figures 5 and 6.

Figure 11 illustrates another arrangement of fuel channels and metering means for conveying and controlling fuel flow from the diaphragm chamber 30 to the main nozzle or orifice 48 and the idling and low speed orifices. In this form the fuel to be delivered through the main orifice and idling and low speed orifices is conveyed from the chamber 30 through a single channel 190. As illustrated in Figure 11 the passage 172 is in communication with the recess 72 formed in the upper wall of chamber 30 by means of the restricted channel or passage 190 and the fuel delivered to the main and low speed and idling orifice flows through this channel.

The passages 170 and 172 are in communication with each other through the medium of a drilled passage 192, the entrance of the drilled passage 192 being closed by means of a plug or swaged shot 194. The cross-sectional area of the drilled passage 192 is of comparatively small area presenting a restricted fuel passage. It has been found that the liquid seal can be controlled in the calibration of the passages providing sufficient strength so that the seal will not be disrupted or impaired by the reduced pressure in the diaphragm chamber yet not of such high value as to cause undue response or laggard delivery of fuel through the nozzle.

The valve members 174 and 178 are adjustable in the same manner as illustrated in Figure 10. It should be noted that in Figures 10 and 11 the fuel regulating or controlling valves or valve members 174 and 178 are accessible from the side of the carburetor body. In some engine and carburetor installations, due to the presence of other elements or components utilized with the engine construction, it is impracticable to obtain access to needle valve members when they are positioned as shown in Figures 10 and 11.

Figure 12 is illustrative of fuel metering or controlling means for the main orifice and the idling and low speed orifices accessible adjacent the air inlet zone of the mixing passage in the carburetor. In this arrangement a passage 200 accommodates a needle valve or metering valve member 202 having a needle or cone shaped valve portion 204 adapted for cooperation with a restricted passage 206.

The restricted passage 206 establishes communication between the passage 200 and the recess 72 of the fuel chamber 30. The main fuel orifice 48 is in communication with the passage 200 by means of a restricted duct or passage 208. In this form, the passage 172, which in the other forms is in communication with the main orifice 48, is plugged or blocked by an impediment or sealing means 210.

The carburetor body in this form is provided with a passage 212 arranged to receive and accommodate an adjustable valve member 214 having a needle shaped valve portion 216 arranged for cooperation with a restricted duct or passage 218 which leads into or communicates with the passage 170. The entrance zones of both passages 170 and 172 are closed by plugs 215. The passage 170 is in communication with the auxiliary chamber 53 adjacent the idling and low speed orifices 50 and 52 by means of the restricted passage 186.

The auxiliary chamber 53 adjacent the low speed and idling speed orifices is separated from the chamber 30 by means of a closure or plug 55 shown in Figure 5. The fuel for delivery into the mixing passage through the idling and low speed orifices 50 and 52 flows from the recess 72 in the chamber 30 through the restricted passage 190 through the intersecting passages 172 and 212 past the metering needle or valve 216 through the restricted passage 218 through passages 170 and 186 into the auxiliary fuel chamber 53. The fuel for delivery from the main nozzle 48 flows from the recess 72 through the restricted passage 206 past the needle valve 204 and through the restricted passage 208 into the main fuel discharge outlet or nozzle 48.

Heretofore it has been a practice to provide a ball check valve or other mechanical valve means associated with the main nozzle fuel delivery arrangement in order to prevent air from the mixing passage bleeding back through the main nozzle when the low speed or idling fuel delivery arrangement or system is in operation. The admission or bleeding of air nullifies the aspiration effect on the diaphragm and impairs or interrupts fuel flow into the diaphragm chamber 30 as well as admitting air instead of fuel to enter the idling system causing immediate stoppage of fuel delivery in the idling system.

In the charge forming device or carburetor of the present invention, the ball valve or other mechnical valve blocking or sealing means is eliminated and the fuel channels and metering means and other components of the construction are of such a size and of a particular arrangement whereby a liquid seal is established or set up, provided by the liquid fuel in the passages. In the present arrangement the capillary action and surface tension of the liquid fuel is utilized in a manner to establish an effective seal for the above mentioned purposes.

The dimensions of several components of the construction and the maintenance of pressures within certain limits are factors contributing to the successful operation of the carburetor. To enable a clear understanding of the invention, reference is directed to Figure 9 which is of schematic character illustrating the components and factors which establish, affect or control the maintenance of an effective liquid seal.

In Figure 9, A indicates the restricted passage 188 shown in Figures 10 and 11 and the restricted passage 206 in Figure 12, B indicates the annular space surrounding the needle valve portion of the metering needles or valves for metering or regulating fuel flow to the main nozzle 48, C indicates the passage zone of the main orifice and D indicates the outlet zone of the main orifice 48 opening into the mixing passage 12. E indicates the entrance of the passage A opening into the recess 72 of the diaphragm chamber 30.

Distance F indicates the length of the lever arm from the supporting pin 75 of the lever 74 to the point of engagement of the member 80 of the diaphragm assembly with the lever arm 81. G indicates the length of the short lever arm between the axis of pin 75 and the axis of the inlet valve member 88. K indicates the vertical distance between the outlet D of the main orifice 48 and the axis of the needle valve employed for regulating or metering fuel flow from the diaphragm chamber to the main orifice.

J indicates the vertical distance between the plane of the outlet D of the main nozzle and the axis of the metering valve means for metering or regulating the flow of liquid fuel from the diaphragm chamber 30 to the idling and low speed orifices 50 and 52. L indicates the vertical distance from the main orifice outlet D to the upper wall of the recess 72 in communication with the diaphragm chamber 30. I indicates the vertical distance from the outlet D of the main orifice to the normal plane of the diaphragm 32 of the carburetor construction.

It is found that the effectiveness of the liquid fuel seal against inward or reverse flow of air from the mixing passage through the main nozzle 48 between the points D to E in Figure 9 involves or is dependent upon the capillary meniscus or surface tension capping effect at the outlet D of the main nozzle, the frictional liquid resistance in the passage C, liquid resistance, a capillary seal set up or established at the annular zone B surrounding the metering valve for the main nozzle and the liquid resistance provided by the restricted passage A. It has been found that the factors such as the diameter, length and contours of these liquid passages may be fashioned and the metering means adjusted or controlled to increase or decrease the combined or overall resistance to liquid flow and secure the sealing or check valve effect that is necessary to the successful operation of the carburetor.

It is to be understood that the combined or overall liquid resistance between zones A and B must be kept within the calibration limits necessary for the delivery of the requisite amount of fuel through the main nozzle 48 for normal carburetor requirements during normal engine operation and hence allied or associated factors or elements in the carburetor must be arranged, calibrated and controlled so that the requirements of strength of the liquid seal can be maintained.

Particular attention must be made in respect of the finite dimensions of other components of the carburetor construction. One of the primary factors contributing to the successful operation of the carburetor is to establish delivery of fuel into the mixing passage with the minimum value of subatmospheric pressure, that is, with a minimum of lift distance betwen the fuel chamber or passage 30 and the outlet zone D of the main nozzle.

Certain mechanical components of the arrangement must be properly dimensioned and correlated with other elements in order to obtain successful operation. With particular reference to the control system for regulating fuel flow from a supply into the carburetor fuel chamber 30, the spring 83 bearing against the lever member 74 must necessarily exert sufficient pressure on the inlet needle valve member 88 to close the valve portion 90 thereof against several pounds per square inch of fuel pressure so as to prevent uncontrolled flooding of the carburetor.

In practice it has been found that the spring 83 should exert expansive force so that it will effectively close the inlet needle valve against a pressure of approximately ten pounds per square inch. However, the greater the expansive pressure or force of the spring 83, the greater the subatmospheric or reduced pressure in the chamber 30 will be required to overcome the force of the spring and admit fuel flow into the carburetor past the valve member 88.

It should be noted, however, that the relative lengths of the lever arms indicated by letters F and G in Figure 9, is such that a comparatively low diaphragm effort or comparatively minor amount of reduced or subatmospheric pressure in the chamber 30 is required to overcome the pressure of the spring 83 to establish fuel flow into the chamber 30.

As previously stated, the carburetor should be fashioned so as to provide a minimum lift factor between the outlet D of the main orifice and the plane of the diaphragm 32 and dimensions or distances indicated at K, J and L should be maintained at a minimum for most successful operation of the arrangement. The dimension or distance I indicated at Figure 9 being the vertical distance between the orifice outlet D the plane of the diaphragm 32 is important because this distance determines the weight of fuel or gravity load on the diaphragm 32.

Hence, the greater the distance I, the greater the adverse gravity load on the diaphragm and the greater the subatmospheric or reduced pressure required in the diaphragm chamber to cause the fuel inlet valve to open. Operation of the carburetor at a low atmospheric pressure, that is, a pressure just slightly below atmospheric pressure, in the chamber 30 is essential in order not to fracture or break the liquid seal in the main nozzle delivery system under engine idling or low speed conditions and hence the distance or dimension I must be reduced to a minimum insofar as possible consistent with the dimensions of other related components of the carburetor construction.

It is also important that the distance I be kept to a minimum value in order to attain successful operation of the carburetor in inverted position. It should be noted that in the normal position of operation of the carburetor, that is, with the mixing passage disposed above the diaphragm 32, fuel height substantially equal to distance I functions as a negative head and resists or tends to retard fuel flow through the main nozzle into the mixing passage.

However, when the carburetor is in inverted position, the distance or dimension I becomes a positive head of fuel and encourages fuel flow through either the main nozzle system or the idle and low speed fuel delivery system. It is therefore apparent that the distances or dimensions indicated by I, J, K and L, and the volume of liquid fuel in the fuel chamber 30 be maintained at a minimum, actually approaching zero as an ideal condition in order to provide a carburetor which is as position free as possible and to require a minimum of strength of seal, that is, the strength of the liquid seal between the zones or points D and E indicated on Figure 9.

A practical example of carburetor construction embodying the invention which has been found to operate successfully in carrying out the method of the invention includes dimensions as follows:

Dimension I is thirteen thirty-seconds of an inch,
Dimension J is three sixteenths of an inch,
Dimension K is eleven sixty-fourths of an inch, and
Dimension L is five sixteenths of an inch.

In the carburetor construction embodying these distances or dimensions, the subatmospheric pressure within the diaphragm chamber 30 under substantially all operating conditions of the engine is approximately constant and is of a pressure adapted to support a column of water about three-eighths of an inch in height.

It has been found that this value of subatmospheric pressure is existent at substantially all speeds and loads where the fuel supply is at a pressure of several pounds per square inch, but may increase at high speeds if the fuel supply is a low-gravity head. A relatively high subatmospheric pressure in the chamber 30 does not impair operation at high speeds as the main nozzle is in full operation and no seal is required while it is delivering fuel into the mixing passage.

Figure 25 illustrates the typical relative sizes of fuel adjusting valve or needle 170 and the fuel passage A cooperating therewith in one size of carburetor of the invention. The bore A, which corresponds to passage 188 in Figures 10 and 11 and passage 206 in Figure 12, is forty-two thousandths of an inch in diameter. Portion 170a is three thirty seconds of an inch in diameter, and the needle portion 170b is formed with a taper, the included angle O being about 20°. The threaded portion 170c is formed with thirty-two threads per inch.

It has also been found that in a carburetor embodying the dimensions above mentioned, the strength of the liquid seal is maintained without fracture or disruption at pressures supporting a water column up to about one inch in height. This variation in strength of the liquid seal is dependent in a measure upon the sizes of orifices and fuel passages required for calibration adapting the carburetor to different engines, temperature conditions and variations, and the ratio of the amount of lubricating oil to liquid fuel, a mixture usually used in operating engines of the two cycle type.

Figure 24:
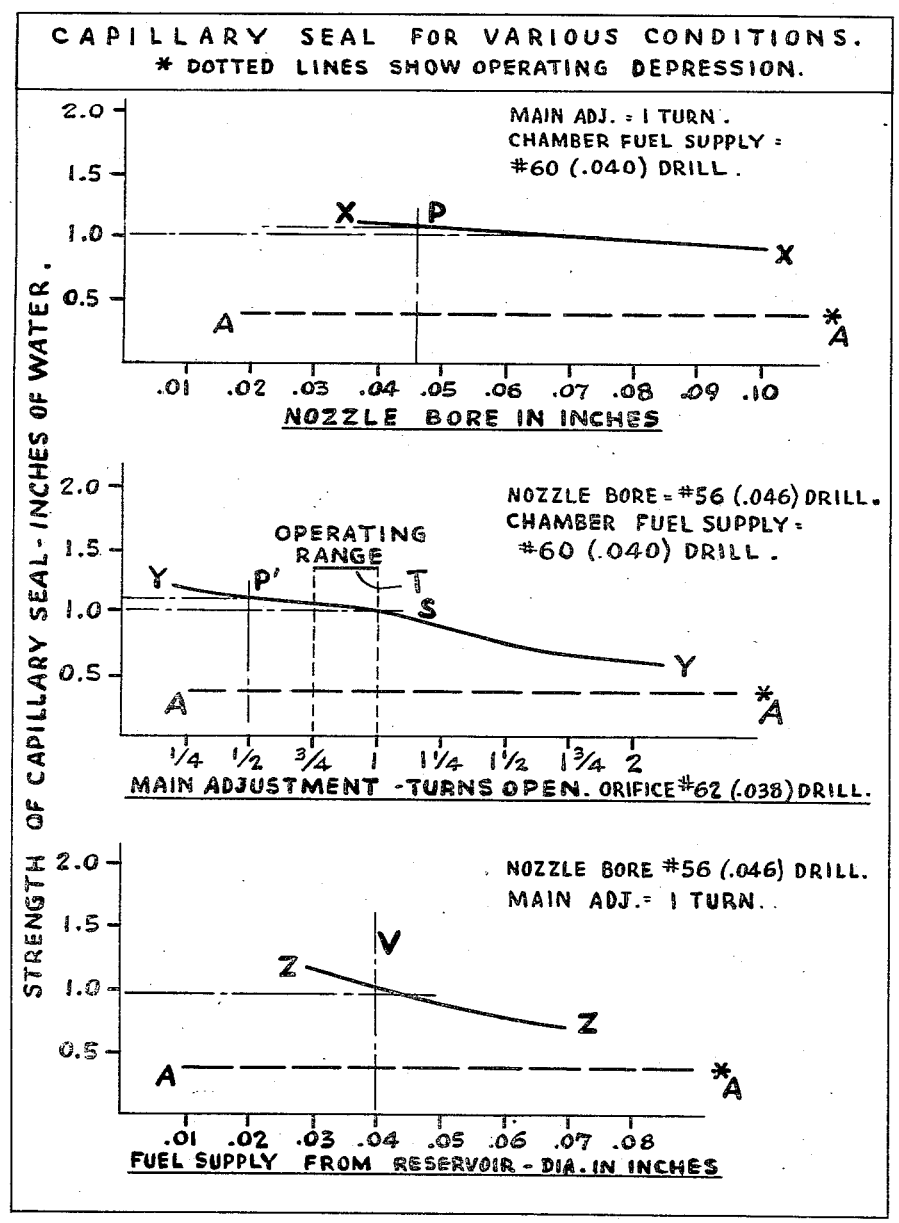
Figure 24 is a graph showing the strength of the capillary seal under various operating conditions.

Figure 24 illustrates graphically actual tests of the strength, magnitude or amplitude of the seal established or influenced by certain structural factors in a carburetor embodying the principles of the present invention.

The upper chart illustrates graphically the strength of the seal in proportion to variations in size of the bore of the main nozzle or discharge orifice. The bore size, indicated along the horizontal co-ordinate, is expressed in hundredths inches and the vertical co-ordinate indicates the negative pressure expressed in inches of water.

The curve XX in the upper chart of Figure 24 indicates the variation in the strength of the capillary seal in the carburetor, the curve indicating the pressure expressed in inches of water at which the seal becomes broken or ineffective. For example, the point P on the curve XX is the intersection of the co-ordinates for a bore of forty-six thousandths of an inch and shows that the seal will not be broken or rendered ineffective until the pressure slightly exceeds that required to support a column of water approximately one and one sixteenth inches in height.

The broken line AA in each of the graphs indicates the negative pressure or pressure below atmospheric pressure effective in the diaphragm chamber or passage. The line AA shows that the negative pressure is that required to support a column of water approximately three-eighths of an inch in height. It has also been found as shown in the graphs, that this operating pressure is substantially constant throughout various speeds of the engine with which the carburetor may be used.

The center graph of Figure 24 illustrates the effectiveness or zones of fracture of the seal in the passage containing the main adjusting needle valve and illustrates the effect upon the seal with various degrees of opening of the needle valve in its passage. In the carburetor utilized in formulating the data on the graphs, the nozzle bore is of a diameter of 56 drill, being forty-six thousandths of an inch, and the fuel supply passage from the diaphragm chamber to the fuel supply needle is the diameter of a number 60 drill, viz. forty thousandths of an inch in diameter. The horizontal co-ordinate represents the proportionate amounts of opening of the main fuel adjusting needle. For example, with the main adjustment opened one-half turn, the point P' on the curve YY, indicates the pressure at which the seal will be broken or disrupted, and this will occur at a pressure slightly above the pressure required to support a column of water approximately one and one-eighth inches in height.

As the line YY indicates the depression in pressure of the carburetor in actual operation, it will be seen that the seal will be effective up to a pressure which will support a column of water one inch in height.

The normal adjustment of the main needle valve of the carburetor is from three-quarters of a turn to one turn toward open position as the operating range identified by the line T. From further examination of the center graph of Figure 24, it will be noted that when the main adjustment is opened a full turn, the capillary seal will not be broken or impaired until the pressure exceeds that required to support a column of water approximately one inch in height, which is indicated by the point S.

The lower graph on Figure 24 illustrates the effect of various sizes of fuel supply passage leading from the diaphragm chamber to the bore containing the main fuel adjusting needle or valve. The curve ZZ indicates the pressures at which the seal will be broken or fractured with varying sizes of fuel supply passage. For example, the point V indicates the maximum strength of the capillary seal with a fuel passage of forty thousandths of an inch in diameter. A pressure slightly exceeding that which will support one inch of water would fracture or break the capillary seal. It should be noted that the smaller the diameter of fuel supply passage, the greater the pressure required to break the seal. This pressure decreases rapidly upon an increase in diameter of the passage, the strength curve of the seal being indicated by the line ZZ.

It should be noted from the graphs that the strength of the capillary seal in the carburetor in all operating ranges of the carburetor is well above the depression pressure operative in the diaphragm chamber during engine operation. Hence, successful operation of the carburetor will not be impaired as far as the capillary seal is concerned until the pressures indicated by the seal strength curves in the graphs become less than the operating depression or reduced pressure indicated by the broken lines AA in Figure 24.

It has been found that the strength of the liquid seal is by nature consistent and dependable and by reason of this fact, the pressure differential between the normal operating pressure in the fuel chamber 30 and the pressure required to fracture or disrupt the liquid seal is a sufficient factor of safety and may be relied upon as an effective liquid check valve.

It should be further pointed out that the choke band of the Venturi is entirely free of obstruction as the main nozzle outlet is an opening in the wall of the choke band, an arrangement eliminating the use of a conventional nozzle or outlet tube extending into the Venturi. Through this arrangement, the Venturi operates at a high efficiency and can therefore be made slightly smaller in area for the same air flow capacity or for a given size or type of engine. Thus by providing a Venturi having a high efficiency factor, a slight aspiration effect is applied to the liquid seal in the main nozzle under idling conditions which gives or imparts some back-drag effect assisting in maintaining the effectiveness of the liquid seal.

Another advantage in the arrangement is that the high efficiency of the Venturi fosters the substantially instantaneous delivery of fuel from the nozzle and facilitates stable running of the engine at both open throttle and at low speed or idling conditions.

It will be apparent from the foregoing description that the present invention involves an arrangement wherein certain characteristics of the liquid fuel are utilized through a unique combination to obtain an automatic valve action without the use of mechanical devices of any kind. The incorporation of the liquid valve involves no expense, it is not subject to wear and is always instantly operable to perform its sealing functions without requiring any operation on the part of the user.

It is apparent that, within the scope of the invention, modifications and different arrangements may be made other than is herein disclosed, and the present disclosure is illustrative merely, the invention comprehending all variations thereof.

I claim:

1. In combination, a member formed with a fuel chamber, a diaphragm forming a wall of the fuel chamber, a cover member for the diaphragm adapted to be secured to the first mentioned member, said diaphragm being of uniplanar shape and formed of flexible material, a plurality of projections on one of said members, a plurality of openings formed in the diaphragm adapted to receive the projections, the openings in the diaphragm being normally out of registry with the projections on the member whereby registry of the openings in the diaphragm with the projections in assembly stresses the material of the diaphragm radially inwardly to facilitate flexing movements of the diaphragm.

2. In combination, a body member formed with a chamber, a diaphragm forming a wall of the chamber, a cover member for the diaphragm adapted to be secured to the body member, said diaphragm being of planar shape and formed of substantially inelastic flexible material, raised portions on one of said members, said diaphragm being formed with openings adapted to receive the raised portions, the openings in the diaphragm being normally out of registry with the raised portions on the member whereby in assembly registry of the openings in the diaphragm with the raised portions stresses the material of the diaphragm radially inwardly to facilitete flexing movements of the diaphragm.

3. In combination, charge forming apparatus including a body formed with a mixing passage, a fuel chamber formed in the body in close proximity to the mixing passage, a flexible diaphragm forming a wall of the fuel chamber, an orifice in the mixing passage, a fuel inlet for the fuel chamber, said fuel inlet being formed with a valve seat, a valve member having a cone-shaped needle portion at one end thereof extending into the inlet against the pressure of the fuel and cooperating with the seat to regulate fuel flow into the fuel chamber, a lever in the fuel chamber fulcrumed on the body, one arm of the lever being in engagement with the valve member and the other arm in engagement with the central region of the diaphragm, said lever arms being of different lengths whereby force applied by movement of the diaphragm to the lever is multiplied through the lever to actuate the valve member in the fuel inlet duct, a spring engaging the lever at a region between the fulcrum and the zone of engagement of the diaphragm with the lever and adjacent the fulcrum, said fuel chamber being unvented whereby said diaphragm is actuated solely by aspiration set up by air flow through the mixing passage, and a restricted fuel conveying duct in communication with the fuel chamber and the orifice.

4. In combination, a charge forming device for an internal combustion engine including a body formed with a mixing passage, a shallow fuel receiving chamber formed in the body, a flexible diaphragm forming a wall of the chamber, a channel formed in said body having an orifice in the form of an opening in the wall of the mixing passage arranged to deliver liquid fuel from the chamber into the mixing passage under the influence of subatmospheric pressure in the mixing passage, said fuel chamber being unvented, a fuel inlet duct formed in the body, a fuel control valve having a needle portion extending into the duct against the incoming fuel and effective upon an increase in pressure in the chamber to close the duct, a lever fulcrumed within the chamber and having portions engaging the fuel inlet valve and the diaphragm, spring means normally biasing said inlet valve toward closed position, a restricted fuel metering passage establishing communication between the fuel chamber and the orifice in the mixing passage, said diaphragm being disposed relative to said opening in said mixing passage within a maximum distance as determined by the capillary effect of the fuel in said metering passage, said maximum distance being that distance at which the capillary effect of said fuel in said metering passage will maintain said fuel in said passage against a pressure differential equivalent to that pressure required to support a column of water about one inch in height.

5. In combination, a charge forming device for an internal combustion engine including a body formed with a mixing passage, a shallow fuel receiving chamber formed in the body, a flexible diaphragm forming a wall of the chamber, a channel formed in said body having an orifice in the form of an opening in the wall of the mixing passage arranged to deliver liquid fuel from the chamber into the mixing passage under the influence of sub-atmospheric pressure in the mixing passage, said fuel chamber being unvented, a fuel duct formed in the body, a fuel control valve having a needle portion extending into the duct against the incoming fuel and effective upon an increase in pressure in the chamber to close the duct, a lever fulcrumed within the chamber and having portions engaging the fuel inlet valve and the diaphragm, spring means normally biasing said inlet valve toward closed position, a restricted fuel metering passage establishing communication between the fuel chamber and the orifice in the mixing passage, said orifice of said channel being in that region of the wall of the mixing passage nearest the diaphragm, said diaphragm being disposed relative to said opening in said mixing passage within a maximum distance as determined by the capillary effect of the fuel in said metering passage, said maximum distance being that distance at which the capillary effect of said fuel in said metering passage will maintain said fuel in said passage against a pressure differential equivalent to that pressure required to support a column of water about one inch in height.

6. In combination, a charge forming device for an internal combustion engine including a body formed with a mixing passage, a shallow fuel receiving chamber formed in the body, a flexible diaphragm forming a wall of the chamber, a channel formed in said body having an orifice in the form of an opening in the wall of the mixing passage arranged to deliver liquid fuel from the chamber into the mixing passage under the influence of subatmospheric pressure in the mixing passage, said fuel chamber being unvented, a fuel inlet duct formed in the body, a fuel control valve cooperating with the duct effective upon an increase in pressure in the chamber to close the duct, a lever fulcrumed within the chamber and having portions engaging the fuel inlet valve and the diaphragm, spring means normally biasing said inlet valve toward closed position, a restricted fuel metering passage establishing communication between the fuel chamber and the orifice in the mixing passage, said diaphragm being disposed relative to said opening in said mixing passage within a maximum distance as determined by the capillary effect of the fuel in said metering passage, said maximum distance being that distance at which the capillary effect of said fuel in said metering passage will maintain said fuel in said passage against a pressure differential equivalent to that pressure required to support a column of water about one inch in height.

7. In combination, a charge forming device for an internal combustion engine including a body formed with a mixing passage provided with a Venturi, a shallow fuel receiving chamber formed in the body, a flexible diaphragm forming a wall of the chamber, a channel formed in said body having an outlet in the wall of the Venturi without obstructing the Venturi passage arranged to deliver liquid fuel from the chamber into the Venturi under the influence of subatmospheric pressure in the mixing passage, said fuel chamber being unvented, a fuel inlet duct formed in the body, a fuel control valve cooperating with the inlet duct effective upon an increase in pressure in the chamber to close the duct, a lever fulcrumed within the chamber and having portions engaging the fuel inlet valve and the diaphragm, spring means normally biasing said inlet valve toward closed position, a restricted fuel metering passage establishing communication between the fuel chamber and the outlet into the Venturi, said diaphragm being disposed relative to said opening in said mixing passage within a maximum distance as determined by the capillary effect of the fuel in said metering passage, said maximum distance being that distance at which the capillary effect of said fuel in said metering passage will maintain said fuel in said passage against a pressure differential equivalent to that pressure required to support a column of water about one inch in height.

8. In combination, charge forming apparatus as in claim 3 and having a secondary outlet in a wall of the mixing passage communicating with said chamber for supplying fuel to the mixing passage for idling operation.

9. In combination, charge forming apparatus as in claim 4 and having a secondary outlet in a wall of the mixing passage communicating with said chamber for supplying fuel to the mixing passage for idling operation.

10. In combination, charge forming apparatus as in claim 5 and having a secondary outlet in a wall of the mixing passage communicating with said chamber for supplying fuel to the mixing passage for idling operation.

11. In combination, charge forming apparatus as in claim 6 and having a secondary outlet in a wall of the mixing passage communicating with said chamber for supplying fuel to the mixing passage for idling operation.

12. In combination, charge forming apparatus as in claim 7 and having a secondary outlet in a wall of the mixing passage communicating with said chamber for supplying fuel to the mixing passage for idling operation.

13. In combination, charge forming apparatus as in claim 3 and wherein the fuel conveying duct includes a constricted portion of a diameter of between about 0.03 and 0.10 inch.

14. In combination, a charge forming device as in claim 4 and wherein the fuel metering passage includes a constricted portion having a diameter of between about 0.03 and 0.10 inch, and a second constricted portion having a diameter of between about 0.02 and 0.07 inch.

15. In combination, a charge forming device as in claim 5 and wherein the fuel metering passage includes a plurality of constricted portions including a first constricted portion having a diameter of between about 0.03 and 0.10 inch, a second constricted portion having a diameter of between about 0.02 and 0.07 inch, and a third constricted portion comprising an adjustable needle valve in said passage.

16. In combination, a charge forming device as in claim 6 and wherein the fuel metering passage includes a constriction comprising an adjustable needle valve in said passage.

17. In combination, a charge forming device as in claim 7 and wherein said restricted fuel metering passage comprises a plurality of constricted portions including a first constricted portion having a diameter of between about 0.03 and 0.10 inch, a second constricted portion having a diameter of between about 0.02 and 0.07 inch, and a third constricted portion comprising an adjustable needle valve in said passage.

References Cited in the file of this patent

UNITED STATES PATENTS

| Number | Name | Date |
| --- | --- | --- |
| 2,033,354 | Pennington | Mar. 10, 1936 |
| 2,422,529 | Coffey | June 17, 1947 |
| 2,632,475 | Elo | Mar. 24, 1953 |
| 2,642,090 | Barr | June 16, 1953 |
| 2,674,443 | Bracke | Apr. 6, 1954 |
| 2,678,065 | Crookston | May 11, 1954 |
| 2,688,342 | Kehrer et al. | Sept. 7, 1954 |
| 2,712,928 | Winkler et al. | July 12, 1955 |
| 2,713,854 | Conover | July 26, 1955 |
| 2,724,584 | Armstrong | Nov. 22, 1955 |
| 2,733,902 | Phillips | Feb. 7, 1956 |
| 2,768,819 | Bodine | Oct. 30, 1956 |
| 2,774,582 | Bracke | Dec. 18, 1956 |

Disclaimer 2,841,372.—*Bernard C. Phillips*, Toledo, Ohio. APPARATUS FOR DELIVERING COMBUSTIBLE MIXTURE TO AN INTERNAL COMBUSTION ENGINE. Patent dated July 1, 1958. Disclaimer filed Nov. 23, 1962, by the assignee, *The Tillotson Manufacturing Company*.
Hereby enters this disclaimer to claims 3, 8 and 13 of said patent.
[*Official Gazette January 1, 1963.*]